US012803650B2

(12) United States Patent
Shinohara et al.

(10) Patent No.: US 12,803,650 B2
(45) Date of Patent: Nov. 17, 2026

(54) WIRELESS COMMUNICATION MANAGEMENT METHOD, WIRELESS COMMUNICATION MANAGEMENT SYSTEM, AND WIRELESS COMMUNICATION MANAGEMENT DEVICE

(71) Applicant: NTT, Inc., Tokyo (JP)

(72) Inventors: Shoko Shinohara, Musashino (JP); Yusuke Asai, Musashino (JP); Yoshitaka Shimizu, Musashino (JP); Junichi Iwatani, Musashino (JP); Tomoyuki Yamada, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 273 days.

(21) Appl. No.: 18/704,148

(22) PCT Filed: Nov. 9, 2021

(86) PCT No.: PCT/JP2021/041206
§ 371 (c)(1),
(2) Date: Apr. 24, 2024

(87) PCT Pub. No.: WO2023/084607
PCT Pub. Date: May 19, 2023

(65) Prior Publication Data
US 2024/0413887 A1 Dec. 12, 2024

(51) Int. Cl.
*H04B 7/155* (2006.01)
*H04W 16/26* (2009.01)
*H04W 72/29* (2023.01)

(52) U.S. Cl.
CPC ........ *H04B 7/15507* (2013.01); *H04W 16/26* (2013.01); *H04W 72/29* (2023.01)

(58) Field of Classification Search
CPC ... H04B 7/15507; H04W 72/29; H04W 16/26
See application file for complete search history.

(56) References Cited

U.S. PATENT DOCUMENTS

2008/0117857 A1* 5/2008 Myojo .................. H04W 8/005 370/315
2012/0008546 A1 1/2012 Yokoyama et al.
(Continued)

FOREIGN PATENT DOCUMENTS

JP 201717618 1/2017
WO WO 2010113261 10/2010

OTHER PUBLICATIONS

[No Author Listed], "920MHz-Band Telemeter, Telecontrol and Data Transmission Radio Equipment ARIB Standard," Radio Industry Association, Association of Radio Industries and Businesses, ARIB STD-T108 version 1 and 4, Feb. 2012, 11 pages (with English translation).
(Continued)

*Primary Examiner* — Oleg Asanbayev
(74) *Attorney, Agent, or Firm* — Fish & Richardson P.C.

(57) ABSTRACT

A network includes: a first link between a first STA as a repeater and a first AP as a parent device; and a second link between a second STA as a child device and the first STA. A first transmission time is set during which transmission is permitted to the first link based on a first amount of transmission. A second transmission time is set during which transmission is permitted to the second link based on a second amount of transmission. An entire transmission cycle is determined based on the first transmission time and the second transmission time. A first transmission period and a second transmission period do not overlap in the entire transmission cycle. Wireless communication performed on the first link is limited within the first transmission period.
(Continued)

Wireless communication performed on the second link is limited within the second transmission period.

8 Claims, 13 Drawing Sheets

(56) References Cited

U.S. PATENT DOCUMENTS

| | | | | |
|---|---|---|---|---|
| 2019/0188095 | A1* | 6/2019 | Shen | G06F 11/2033 |
| 2021/0058221 | A1* | 2/2021 | Taneja | H04L 5/1461 |

OTHER PUBLICATIONS

[No Author Listed], "Part 11: Wireless LAN Medium Access Control (MAC) and Physical Layer (PHY) Specifications, Amendment 2: Sub 1 GHz License Exempt Operation," IEEE Computer Society, IEEE Std 802.11ah™-2016, Dec. 2016, 594 pages.

* cited by examiner

WIRELESS COMMUNICATION MANAGEMENT METHOD, WIRELESS COMMUNICATION MANAGEMENT SYSTEM, AND WIRELESS COMMUNICATION MANAGEMENT DEVICE

CROSS-REFERENCE TO RELATED APPLICATIONS

This application is a National Stage application under 35 U.S.C. § 371 of International Application No. PCT/JP2021/041206, having an International Filing Date of Nov. 9, 2021, the disclosure of which is considered part of the disclosure of this application, and is incorporated by reference in its entirety into this application.

TECHNICAL FIELD

The present disclosure relates to a wireless communication supervising method, a wireless communication supervising system, and a wireless communication supervising device, and more particularly, to a wireless communication supervising method, a wireless communication supervising system, and a wireless communication supervising device suitable for increasing efficiency of communication via a repeater.

BACKGROUND ART

As a configuration of wireless communication, a configuration is known in which a repeater is interposed between a parent device access point (AP) and a child device station (STA) of wireless communication. In such a configuration, data communication is performed in both a wireless path (hereinafter, referred to as a "first link") between the parent device AP and the repeater, and a wireless path (hereinafter, referred to as a "second link") between the repeater and the child device STA. For this reason, it is necessary to avoid interference between the first link and the second link.

In Non Patent Literature 1 below, a carrier-sense multiple access with collision avoidance (CSMA/CA) method is disclosed as a technology for avoiding interference between a plurality of wireless communication devices arranged adjacent to each other. In the CSMA/CA method, a device that desires data transmission transmits a data frame in a case where carrier sensing is performed and it is determined that there is no interference wave around. According to the method, a device that detects a wireless signal transmitted from another device stops wireless transmission. For this reason, each device can transmit its own wireless signal while avoiding collision with the detected wireless signal.

In addition, as a wireless communication standard, a standard is known that imposes a restriction on a transmission time on each device. For example, in Non Patent Literature 2 below, a technology is disclosed for imposing a restriction that a transmission time per 1 hour (3600 seconds) is 360 seconds (10% of 1 hour) on each device regarding use of a 920 MHz band. According to such a technology, it is possible to suppress imbalanced allocation of the transmission time to only some devices and occurrence of imbalance of the amount of communication as a whole.

CITATION LIST

Non Patent Literature

Non Patent Literature 1: IEEE Std 802.11ah TM-2016 (IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation, IEEE Computer Society, 7 Dec. 2016 Non Patent Literature 2: ARIB STD-T108 version 1.4, "920 MHz-BAND TELEMETER, TELECONTROL AND DATA TRANSMISSION RADIO EQUIPMENT", Apr. 23, 2021

SUMMARY OF INVENTION

Technical Problem

In the configuration in which the repeater is interposed between the parent device AP and the child device STA, a situation may occur in which a wireless signal emitted from the parent device AP reaches the repeater but does not reach the child device STA. Similarly, a situation may occur in which a wireless signal emitted from the child device STA reaches the repeater but does not reach the parent device AP.

Under such an environment, even if a wireless signal is emitted from the parent device AP toward the repeater, the child device STA cannot detect the signal. In addition, even if a wireless signal is emitted from the child device STA toward the repeater, the parent device AP cannot detect the signal.

As a result, a so-called hidden node problem occurs, and around the repeater, a collision occurs between a wireless signal from the parent device AP and a wireless signal from the child device STA. For this reason, in a case where the configuration is used in which the repeater is interposed between the parent device AP and the child device STA, in the conventional CSMA/CA method, a situation is likely to occur in which the transmission time cannot be efficiently used.

In addition, in the configuration in which the repeater is used, if an amount of data provided from the child device STA to the repeater is larger than an amount of data sent from the repeater to the parent device AP, packet loss occurs in the repeater. For example, in a case where the repeater is placed in an environment in which it is difficult to obtain an access right to the parent device AP, if data from the child device STA is uploaded to the repeater one after another, packet loss occurs after an amount of accumulated data of the repeater reaches an upper limit. In addition, under a rule in which limitation of the transmission time is imposed for each device, after the transmission time of the repeater reaches an upper limit, a state occurs in which data is only continuously provided from the child device STA to the repeater, and packet loss still occurs. Also in this case, wireless communication efficiency is deteriorated as a whole.

The present disclosure has been made in view of problems described above, and a first object thereof is to provide a wireless communication supervising method capable of continuing efficient wireless communication in a configuration of wireless communication using a repeater.

In addition, a second object of the present disclosure is to provide a wireless communication supervising system in which efficient wireless communication can be continued in a configuration of wireless communication using a repeater.

In addition, a third object of the present disclosure is to provide a wireless communication supervising device capable of continuing efficient wireless communication in a configuration of wireless communication using a repeater.

Solution to Problem

To achieve the object described above, a first aspect is desirably a wireless communication supervising method for managing wireless communication of a network including a first link for wireless communication between a repeater and a parent device and a second link for wireless communication between a repeater and a child device, the wireless communication supervising method including:

a step of setting a first transmission time during which transmission is permitted to the first link on the basis of a first amount of transmission to be communicated on the first link;

a step of setting a second transmission time during which transmission is permitted to the second link on the basis of a second amount of transmission to be communicated on the second link;

a step of determining an entire transmission cycle on the basis of the first transmission time and the second transmission time, and determining a first transmission period corresponding to the first transmission time and a second transmission period corresponding to the second transmission time not to cause the first transmission period and the second transmission period to overlap each other in the entire transmission cycle; and a step of controlling a wireless device included in the network such that wireless transmission to be performed on the first link is limited within the first transmission period and wireless communication to be performed on the second link is limited within the second transmission period.

In addition, a second aspect is desirably a wireless communication supervising system including a network including a first link for wireless communication between a repeater and a parent device and a second link for wireless communication between a repeater and a child device, the wireless communication supervising system being configured such that at least one of the repeater or the parent device, or both of the repeater and the parent device execute:

processing of setting a first transmission time during which transmission is permitted to the first link on the basis of a first amount of transmission to be communicated on the first link;

processing of setting a second transmission time during which transmission is permitted to the second link on the basis of a second amount of transmission to be communicated on the second link;

processing of determining an entire transmission cycle on the basis of the first transmission time and the second transmission time, and determining a first transmission period corresponding to the first transmission time and a second transmission period corresponding to the second transmission time not to cause the first transmission period and the second transmission period to overlap each other in the entire transmission cycle; and processing of controlling a wireless device included in the network such that wireless transmission to be performed on the first link is limited within the first transmission period and wireless communication to be performed on the second link is limited within the second transmission period.

In addition, a third aspect is desirably a wireless communication supervising device that manages wireless communication of a network including a first link for wireless communication between a repeater and a parent device and a second link for wireless communication between a repeater and a child device, the wireless communication supervising device being configured to execute:

processing of setting a first transmission time during which transmission is permitted to the first link on the basis of a first amount of transmission to be communicated on the first link;

processing of setting a second transmission time during which transmission is permitted to the second link on the basis of a second amount of transmission to be communicated on the second link;

processing of determining an entire transmission cycle on the basis of the first transmission time and the second transmission time, and determining a first transmission period corresponding to the first transmission time and a second transmission period corresponding to the second transmission time not to cause the first transmission period and the second transmission period to overlap each other in the entire transmission cycle; and processing of controlling a wireless device included in the network such that wireless transmission to be performed on the first link is limited within the first transmission period and wireless communication to be performed on the second link is limited within the second transmission period.

Advantageous Effects of Invention

According to the first to third aspects, it is possible to continue efficient wireless communication by preventing collision of frames and preventing occurrence of packet loss, in a configuration of wireless communication using a repeater.

DESCRIPTION OF EMBODIMENTS

First Embodiment

Configuration of First Embodiment

Figure 1:
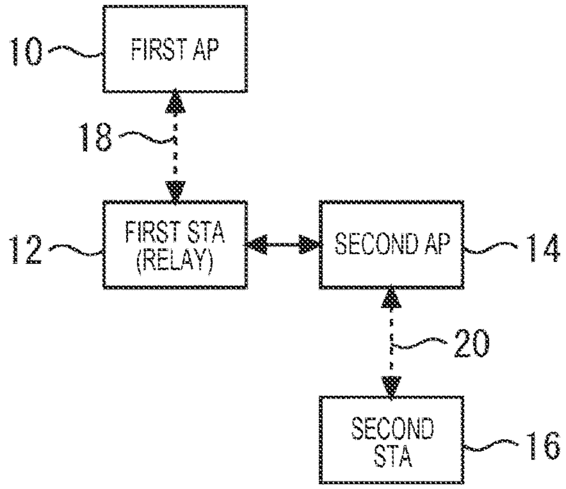
FIG. 1 is a diagram illustrating an example of a network including a wireless communication supervising system of a first embodiment of the present disclosure.

FIG. 1 illustrates an example of a network including a wireless communication supervising system of a first embodiment of the present disclosure. The system illustrated in FIG. 1 includes a first parent device (first AP) 10. The first AP 10 functions as a root AP communicating with a higher-level communication system via a communication path (not illustrated).

A first child device (first STA) and repeater 12 is communicably connected to the first AP 10 via a wireless section. The first child device and repeater 12 has a function of a child device for enabling wireless communication with the first AP 10, and a function of a repeater. Hereinafter, the first child device and repeater 12 is referred to as a "first STA 12" for convenience.

A second parent device (second AP) 14 is connected to the first STA 12. The first STA 12 and the second AP 14 may be physically separate devices. In this case, it is assumed that both are connected together by wire. In addition, the first STA 12 and the second AP 14 may be a device integrated together. In this case, it is assumed that both are connected together by internal connection. The first STA 12 can relay data emitted from the first AP 10 toward the second AP 14 and can relay data emitted from the second AP 14 toward the first AP 10.

A second child device (second STA) 16 is communicably connected to the second AP 14 via a wireless section. That is, in the wireless communication supervising system illustrated in FIG. 1, wireless links are respectively formed between the first AP 10 and the first STA 12 and between the second AP 14 and the second STA 16. Hereinafter, the former is referred to as a "first link 18", and the latter is referred to as a "second link 20".

Figure 2:
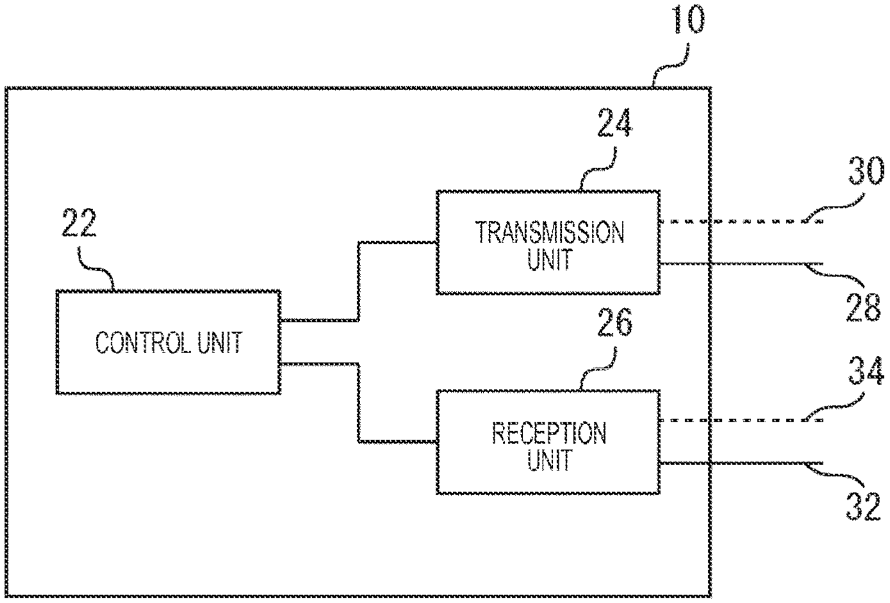
FIG. 2 is a diagram for explaining a configuration of a first parent device AP 10 included in the wireless communication supervising system of the first embodiment of the present disclosure.

FIG. 2 is a block diagram for explaining a configuration of the first AP 10. As illustrated in FIG. 2, the first AP 10 includes a control unit 22. The control unit 22 includes an arithmetic processing unit and a memory (not illustrated). A function of the control unit 22 is implemented by the arithmetic processing unit executing processing according to a program stored in the memory.

The first AP 10 also includes a transmission unit 24 and a reception unit 26. The transmission unit 24 and the reception unit 26 performs transmission and reception of data frames in accordance with a command from the control unit 22. The transmission unit 24 has a function for enabling wired transmission 28 and wireless transmission 30. Similarly, the reception unit 26 has a function for enabling wired reception 32 and wireless reception 34. In the present embodiment, the wireless transmission 30 and the reception 34 among them are performed by the first link 18.

Each of the first STA 12 and the second AP 14 has a hardware configuration similar to that of the first AP 10 illustrated in FIG. 2. The first STA 12 implements communication for relay by functions of transmission and reception via wire (corresponding to 28 and 32), and implements communication with the first AP 10 by functions of transmission and reception via wireless (corresponding to 30 and 34). In addition, the second AP 14 implements communication for relay by functions of transmission and reception via wire (corresponding to 28 and 32), and implements communication with the second STA 16 by functions of transmission and reception via wireless (corresponding to 30 and 34).

Figure 3:
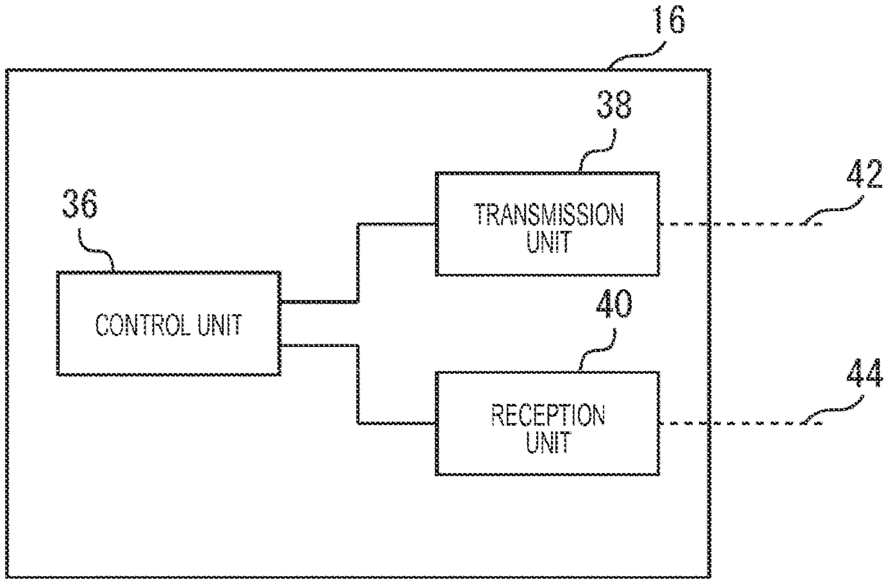
FIG. 3 is a diagram for explaining a configuration of a second child device STA 16 included in the wireless communication supervising system of the first embodiment of the present disclosure.

FIG. 3 is a block diagram for explaining a configuration of the second STA 16. The second STA 16 includes a control unit 36, a transmission unit 38, and a reception unit 40. These have substantially the same functions as those of the elements illustrated in FIG. 2 except that the transmission unit 38 and the reception unit 40 have only functions of wireless transmission 42 and reception 44. The second STA 16 implements communication via the second link 20 by those functions of the transmission 42 and the reception 44 by wireless.

Problems to Be Solved by First Embodiment

Figure 4:
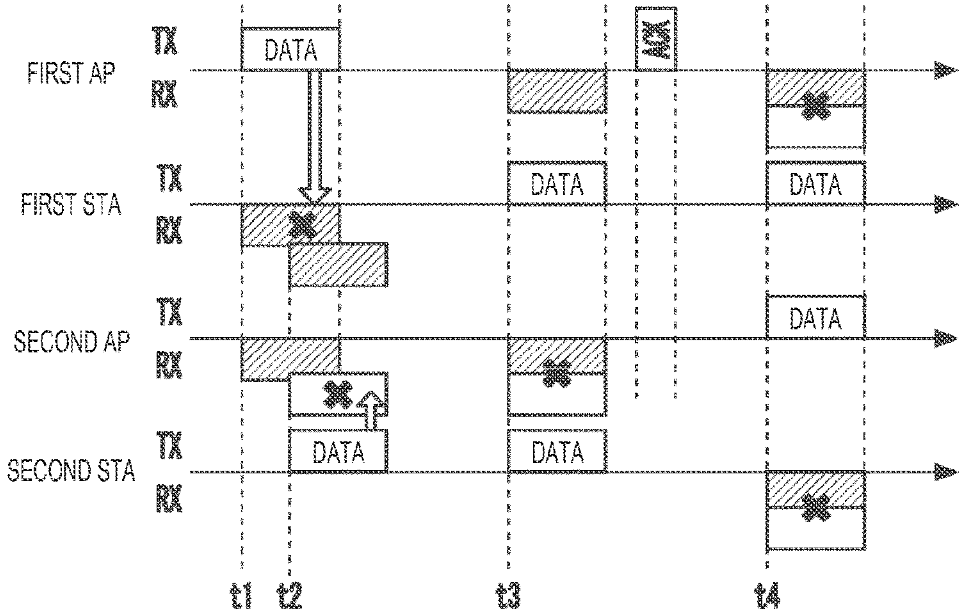
FIG. 4 is a diagram for explaining a frame collision that occurs in a case where a CSMA/CA method is used.

FIG. 4 is a diagram for explaining a problem that occurs in a case where a CSMA/CA method is applied to the network illustrated in FIG. 1. In the CSMA/CA method, a device that desires wireless data transmission executes carrier sensing, that is, performs confirmation that no wireless signal is emitted from another device, and transmits a data frame in a case where the confirmation is obtained.

In the network illustrated in FIG. 1, it is assumed that the first STA 12 and the second AP 14 are arranged at substantially the same position or in the same housing. On the other hand, since it is sufficient for the first AP 10 to communicate with the first STA 12 via the first link 18, a situation may occur in which a wireless signal emitted by the first AP 10 is not detected by the second STA 16. Similarly, a situation may also occur in which a wireless signal emitted from the second STA 16 is not detected by the first AP 10. As described above, in the network illustrated in FIG. 1, each of the first AP 10 and the second STA 16 may be a "hidden node" that is invisible from the other.

In FIG. 4, a series of events starting at time t1 indicates a state in which collision of data frames occurs after time t2 because the first AP 10 and the second STA 16 are hidden nodes. In addition, a series of events starting at time t3 indicates a state in which the second AP 14 is affected by frame collision due to that the first STA 12 and the second STA 16 simultaneously start uploading data frames. Further, a series of events starting at time t4 indicates a state in which both the first AP 10 and the second STA 16 as reception devices are affected by data collision due to that the first STA 12 and the second AP 14 simultaneously start transmitting data frames.

In the CSMA/CA method, frame collision as described above may occur because each node accesses a channel on the basis of a result of carrier sensing regardless of each other's transmission state. Even if the channel is divided between the first STA 12 and the second AP 14 in charge of relaying, a frame error rate is significantly high due to each other's leakage power in a case where divided channels are adjacent to each other. For this reason, in the network assumed in the present embodiment, it is difficult to implement efficient communication by the CSMA/CA method.

Figure 5:
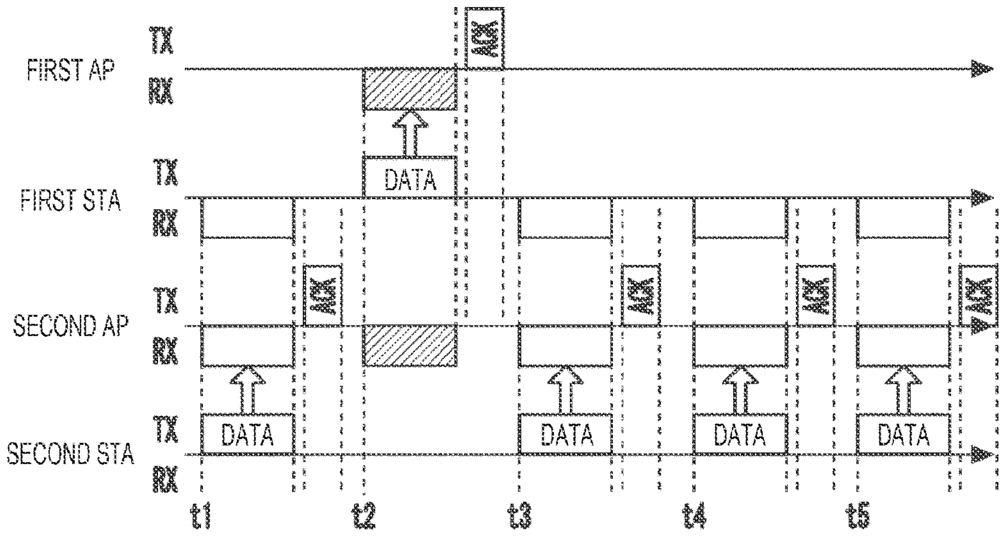
FIG. 5 is a diagram for explaining packet loss that occurs due to imbalance of the amount of data transmission.

FIG. 5 illustrates a state in which packet loss occurs due to imbalance of the amount of data transmission. In a configuration of the network of the present embodiment, the first STA 12 may be placed in an environment in which it is difficult to obtain an access right to the first AP 10. In addition, it is also assumed that the network is used under an environment in which a restriction on a transmission time is imposed on each node, such as the 920 MHz band in Japan, for example.

In the example illustrated in FIG. 5, data is uploaded from the second STA 16 to the second AP 14 at time t1. Further, the data uploaded to the second AP 14 is provided to the first STA 12 through a wired or internal connection path. Since data transfer has succeeded, an Ack signal is generated in the second AP 14. Then, the second STA 16 recognizes success of data transmission by the Ack signal, and thereafter, requests data uploading at times t3, t4, and t5 similarly.

On the other hand, at time t2, the first STA 12 acquires the access right to the first AP 10 and transfers received data, but thereafter, has not successfully transferred received data. Such a situation can sufficiently occur in a case where the first STA 12 is placed in an environment in which it is difficult to acquire the access right to the first AP 10. In addition, taking the 920 MHz band of Japan as an example, a time during which each node can transmit data is limited to 360 sec per 1 hour (3600 sec). Then, if the first STA 12 has used up the time of 360 sec in transmission at time t2, the data is provided to the first STA 12 after time t3 unilaterally. Since the packet accumulation capability of the first STA 12 is limited, if the state as illustrated in FIG. 5 continues, packet loss occurs in which a packet emitted from the second STA 16 disappears without reaching the first AP 10.

Feature of First Embodiment

Figure 6:
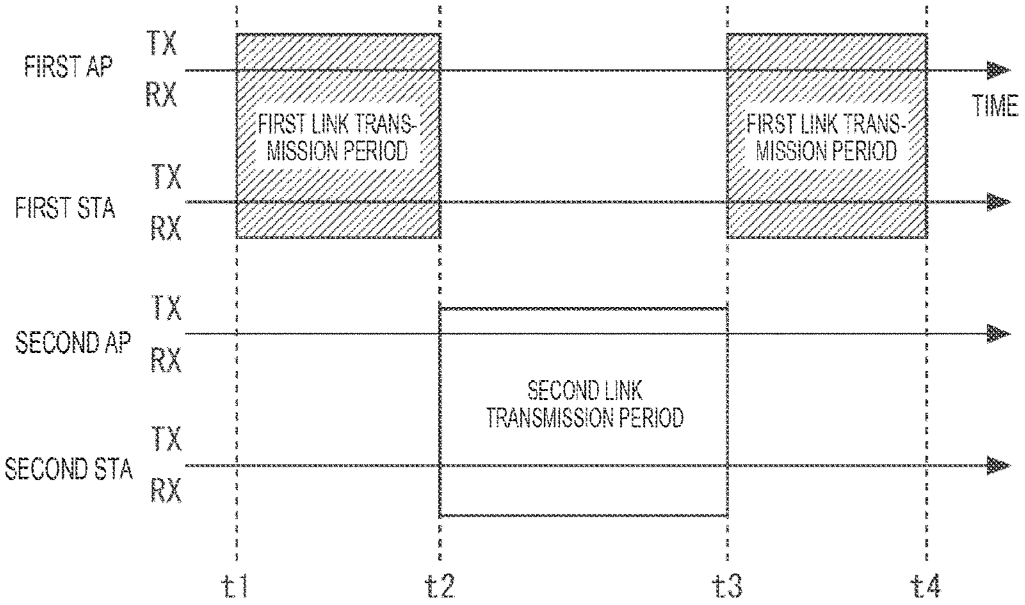
FIG. 6 is a diagram for explaining a feature of the wireless communication supervising system of the first embodiment of the present disclosure.

FIG. 6 is a timing chart for explaining an outline of a communication rule adopted in the present embodiment to solve problems described above. In a technology of the present embodiment, allocation of a transmission period is determined for each of the first link 18 between the first AP 10 and the first STA 12, and the second link 20 between the second AP 14 and the second STA 16. Then, transmission on each of the first link 18 and the second link 20 is permitted only in the determined transmission period.

FIG. 6 illustrates an example in which a period from time t1 to time t2 and a period from time t3 to time t4 are determined as transmission periods for the first link 18, and a period from time t2 to time t3 is set as a transmission period for the second link 20. Each transmission period is determined on the basis of the number of packets acceptable to be received, communication quality, and the like. In addition, in a case where there is a limitation of the transmission time, each device performs transmission within a range not exceeding the limitation of the transmission time in each transmission period.

In the present embodiment, the transmission period of each link is determined by the first STA 12 having a relay function. Then, actual transmission limitation is performed by using a target wake time (TWT) method, a restricted access window (RAW) method, or the like. In addition, transmission outside the transmission period may be suppressed by using a function of temporarily stopping transmission from a module due to a sleep mode or the like. However, for a beacon frame or the like, transmission outside the transmission period may be permitted for synchronization or new node connection except for a case where laws and regulations cannot be complied with when a plurality of nodes performs transmission simultaneously.

The network of the present embodiment can be used for Internet of Things (IoT) applications. For example, the first STA 12 and the second STA 16 are mounted on electric appliances and the like, and can upload data indicating device states and the like to the first AP 10 and the second AP 14, respectively. In addition, the first STA 12 and the second STA 16 can download, for example, update data, from the first AP 10 and the second AP 14, respectively.

In the network of the present embodiment, data uploaded from the second STA 16 to the second AP 14 is relayed by the first STA 12 and transmitted to the first AP 10 via the first link 18. In addition, data downloaded by the second STA 16 is also provided from the first AP 10 via relay of the first STA 12. That is, while the second link 20 transmits only data exchanged by the second STA 16, the first link 18 transmits data for two STAs, the first STA 12 and the second STA 16. For this reason, it is desirable to use a transmission rate as high as possible in the first link 18.

In particular, in an environment in which limitation of the transmission time is imposed as in the 920 MHz band in Japan, being able to a larger number of packets within the same time is more advantageous for capacity expansion. For this reason, in the first link 18, for example, it is desirable to use a wide band (4 MHz band for IEEE. 11ah). In addition, in the second link, it is desirable to use a band (1 MHz band or the like that does not overlap with 4 MHz band for IEEE. 11ah) that does not interfere with the wide band. As described above, in the present embodiment, in principle, a wider band than the band for the second link 20 is assigned to the first link 18. Then, the transmission period for the first link 18 and the transmission period for the second link 20 are calculated on the basis of the transmission rate in consideration of the bandwidths thereof.

Transmission Period Calculation Example (Part 1)

Figure 7:
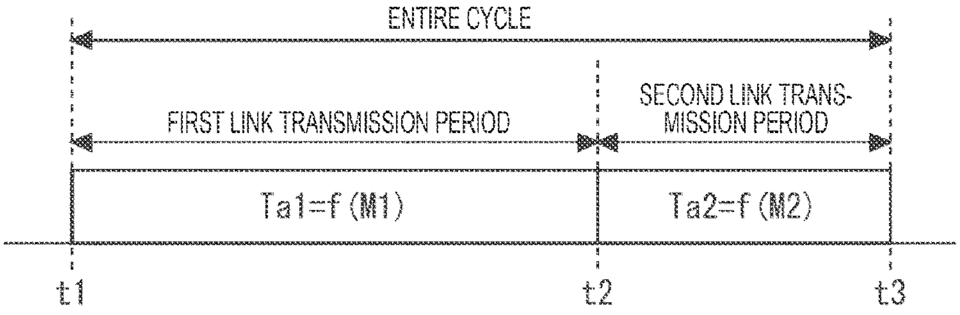
FIG. 7 is a diagram for explaining an example of a transmission period determined on the basis of optimal transmission rates of a first link and a second link in the first embodiment of the present disclosure.

FIG. 7 is a timing chart for explaining an example of a transmission period set on the basis of the transmission rate by the system of the present embodiment. In the network of the present embodiment, as described above, packet congestion is likely to occur in the first STA 12 in charge of relay processing. For this reason, setting of a transmission period is first performed for the first STA 12, that is, for the first link 18. Then, a transmission period related to another node or a parent device is determined according to the transmission period for the first link 18.

A packet received by the first STA 12 from the first AP 10 for relay is directly a transmission packet addressed to the second STA 16. In addition, a packet received by the first STA 12 from the second STA 16 is a transmission packet addressed to the first AP 10. For this reason, it is possible to strike a balance between transmission and reception by calculating a ratio of a time for transmitting a packet to a time for receiving a packet as a transmission period.

For example, in a case where an optimal transmission rate for the first link 18 is determined to be M1 from propagation path loss and noise power, a frame time length Ta1 can be calculated as Ta1=f(M1) as a function of M1. On the other hand, also for the second link 20, in a case where an optimal transmission rate is determined to be M2, a frame time length Ta2 can be calculated as Ta2=f(M2) as a function of M2. However, in a case where there is a plurality of nodes functioning as the second STA 16, a minimum value, an average value, a median value, or the like of their transmission rates is selected as a representative value, and the frame time length Ta2 is calculated on the basis of the representative value. In addition, if there is a transmission rate, a traffic rate, or the like set by an application being used, a value thereof is referred to.

When the packet time length Ta1 for the first link 18 and the packet time length Ta2 for the second link 20 can be calculated, next, a transmission period in the entire cycle is set by the following calculation formula.

$$\text{Transmission period for the first link 18} = Ta1/(Ta1+Ta2) \quad (1)$$

$$\text{Transmission period for the second link 20} = Ta2/(Ta1+Ta2) \quad (2)$$

Figure 8:
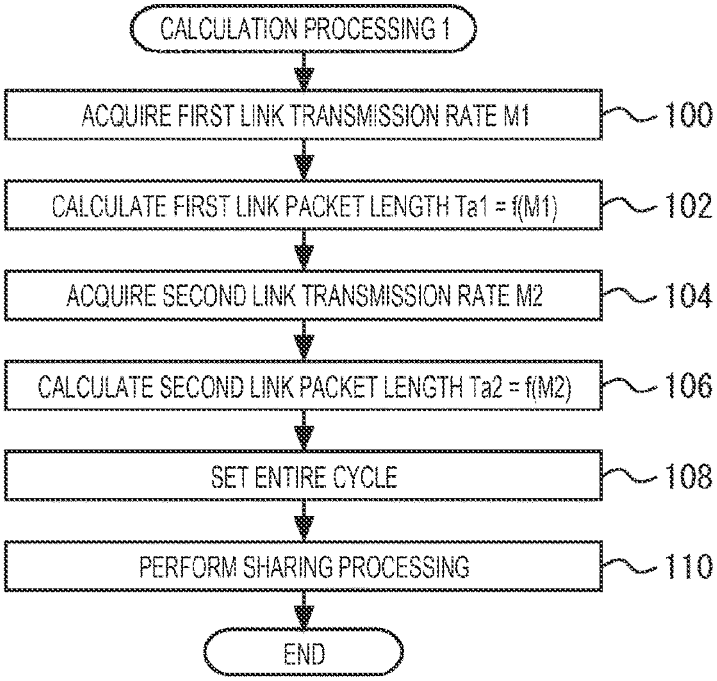
FIG. 8 is a flowchart for explaining a flow of first processing performed by a repeater in the first embodiment of the present disclosure.

FIG. 8 is a flowchart for explaining a flow of processing performed by the first STA 12 to set a transmission period by the method described above. According to a routine illustrated in FIG. 8, first, the first STA 12 acquires the optimal transmission rate M1 for the first link 18 (step 100). Next, the packet time length Ta1=f(M1) necessary for transmission at the acquired transmission rate M1 is calculated (step 102).

Similarly, the optimal transmission rate M2 for the second link 20 is acquired (step 104), and further, the packet time length Ta2=f(M2) for the second link 20 is calculated on the basis of M2 (step 106). Subsequently, the entire cycle is set in accordance with the above-described formulas (1) and (2) (step 108).

When the above processing is ended, processing is performed for sharing the transmission period for the first link 18 and the transmission period for the second link 20 among devices belonging to the network (step 110). Specifically, by an access control method conforming to a wireless system standard such as TWT or RAW described above, processing is executed for prohibiting wireless transmission by the first AP 10 and the first STA 12 outside the transmission period for the first link 18, and for prohibiting wireless transmission by the second AP 14 and the second STA 16 outside the transmission period for the second link 20. However, a method for prohibiting wireless transmission is not limited thereto. For example, a function for the method may be implemented by control from a higher-level layer, control by software that has been explored though it is firmware of a wireless device, or the like.

According to the above processing, for each of the first link 18 and the second link 20, it is possible to set a transmission period suitable for transmitting data at the optimal transmission rate M1 or M2. For this reason, packets are not congested in the first STA 12 in charge of relay, and the problem of packet loss described above can be solved.

In addition, according to the processing, it is possible to avoid that a wireless signal transmitted on the first link 18 and a wireless signal to be transmitted on the second link 20 are overlapped and transmitted. For this reason, unlike a case where the CSMA/CA method is used, it is possible to appropriately avoid the collision of the data frames, such as that as described with reference to FIG. 4 or FIG. 5.

Transmission Period Calculation Example (Part 2)

Figure 9:
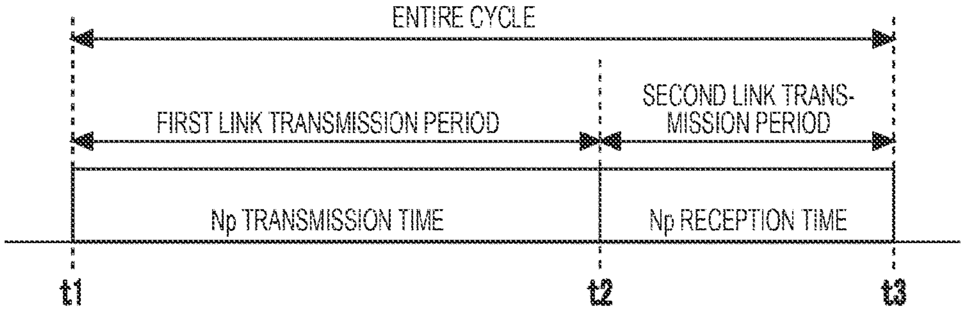
FIG. 9 is a diagram for explaining an example of a transmission period determined on the basis of limitation of the transmission period in the first embodiment of the present disclosure.

FIG. 9 is a timing chart for explaining an example of a transmission period set on the basis of a transmission time limit time by the system of the present embodiment. In the network of the present embodiment, as described above, packet congestion is likely to occur in the first STA 12 in charge of relay processing. Then, in a case where a limitation of the transmission time is imposed on a node at a relay point, if the first STA 12 receives traffic for relay exceeding the limitation, packet loss occurs in the first STA 12. For this reason, in the present embodiment, a number Np of packets received by the first STA 12 is set according to the limit time.

For example, in a case where the network of the present embodiment is used in an IoT normal environment, it is considered that a large amount of uplink traffic is generated. In this case, to relay the traffic, the number Np of packets receivable by the first STA 12 is calculated from a transmission limit time (for example, 360 sec per 1 hour), a transmission rate, and a retransmission rate. Then, a transmission time Tb1 necessary for transmitting the number Np of packets is calculated. Specifically, a time obtained by adding a time required for one transmission based on an access frequency calculated from a peripheral overlapping basic service set (OBSS) to a time during which a wireless signal in which the number of packets is Np can be transmitted is calculated as Tb1.

Next, a transmission time Tb2 required to transmit the number Np of packets to the second AP 14 is calculated. The transmission time Tb2 is calculated on the basis of a transmission rate (a representative rate, such as an average value of rates of respective nodes in a case where there is a plurality of nodes) assumed in the second link 20 and an access frequency calculated from the number of peripheral OBSSs.

When the transmission time Tb1 for transmitting the number Np of packets on the first link 18 and the time Tb2 required for the second AP 14 to receive the number Np of packets via the second link 20 can be calculated, next, a transmission period in the entire cycle is set by the following calculation formula.

$$\text{Transmission period for the first link 18} = Tb1/(Tb1+Tb2) \quad (3)$$

$$\text{Transmission period for the second link 20} = Tb2/(Tb1+Tb2) \quad (4)$$

Figure 10:
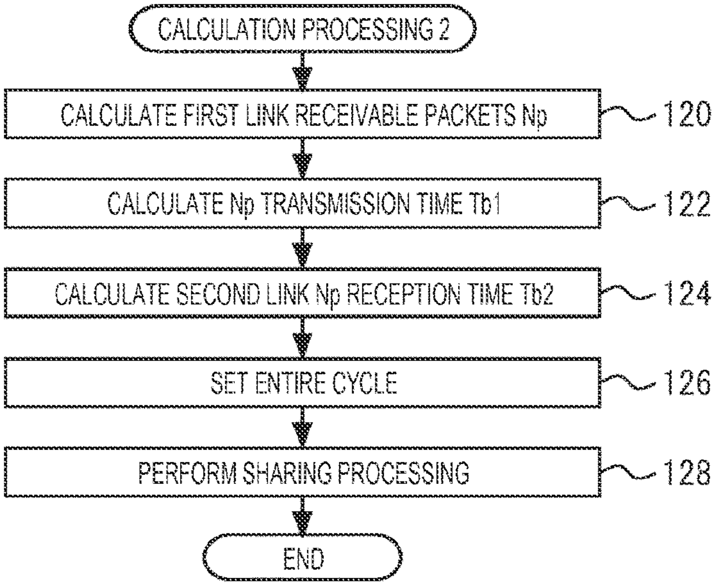
FIG. 10 is a flowchart for explaining a flow of second processing performed by the repeater in the first embodiment of the present disclosure.

FIG. 10 is a flowchart for explaining a flow of processing performed by the first STA 12 to set a transmission period by the method described above. According to a routine illustrated in FIG. 10, first, the number Np of packets receivable by the first STA 12 is calculated on the premise that transmission is performed on the first link 18 (step 120). Next, the transmission time Tb1 of the number Np of packets is calculated by the method described above (step 122).

Next, the time Tb2 required for the second AP 14 to receive the number Np of packets via the second link 20 is calculated (step 124). Subsequently, the entire cycle is set in accordance with the above-described formulas (3) and (4) (step 126).

When the above processing is ended, processing is performed for sharing the transmission period for the first link 18 and the transmission period for the second link 20 among network devices (step 128). Specifically, processing is executed for prohibiting wireless transmission by the first AP 10 and the first STA 12 outside the transmission period for the first link 18, and for prohibiting wireless transmission by the second AP 14 and the second STA 16 outside the transmission period for the second link 20. The processing of step 128 is implemented by access control such as TWT and RAW, control from a higher-level layer, control by software installed in firmware, and the like, similarly to the case of step 110 described above.

According to the above processing, it is possible to avoid that packets are sent to the first STA 12, in which the number of the packets exceeds the number Np of packets receivable. For this reason, packets are not congested in the first STA 12 in charge of relay, and it is possible to prevent packet loss from occurring in the first STA 12.

In addition, according to the processing, similarly to the case of the processing illustrated in FIG. 8, it is possible to avoid that a wireless signal transmitted on the first link 18 and a wireless signal to be transmitted on the second link 20 are overlapped and transmitted. For this reason, also by the processing illustrated in FIG. 10, it is possible to appropriately avoid the collision of the data frames, such as that as described with reference to FIG. 4 or FIG. 5.

Modification of First Embodiment

Meanwhile, in the first embodiment described above, a procedure of the "transmission period calculation example (part 2)" has been described assuming a case where a large amount of uplink traffic is generated, but calculation can also be performed similarly in a case where a large amount of downlink traffic is generated. For example, in a case where an update program is provided for updating each device in an IoT system, the calculation method may be switched to the following method on the assumption that a large amount of downlink traffic is generated.

That is, in a case where a large amount of downlink traffic is generated, even if the transmission by the first AP 10 is performed within a limit time during which a wireless signal can be transmitted, a case occurs where a transmission rate by the second AP 14 that relays the transmission is low, or the second AP 14 cannot sufficiently transmit packets due to interference from the OBSS. In such a case, it is conceivable to strike a balance for the purpose of limiting the transmission period for the first link 18. Specifically, a number Np2 of packets that can be transmitted on the second link 20 may be calculated first, and the transmission period of each link may be set on the basis of Np2.

In addition, in the first embodiment described above, the first STA 12 in charge of the relay function is caused to execute processing of performing calculation of the transmission period of each link and making a result of the calculation known in the network. However, a device that executes the processing is not limited to the first STA 12. For example, the processing may be executed by the first AP 10.

Second Embodiment

Configuration of Second Embodiment

Figure 11:
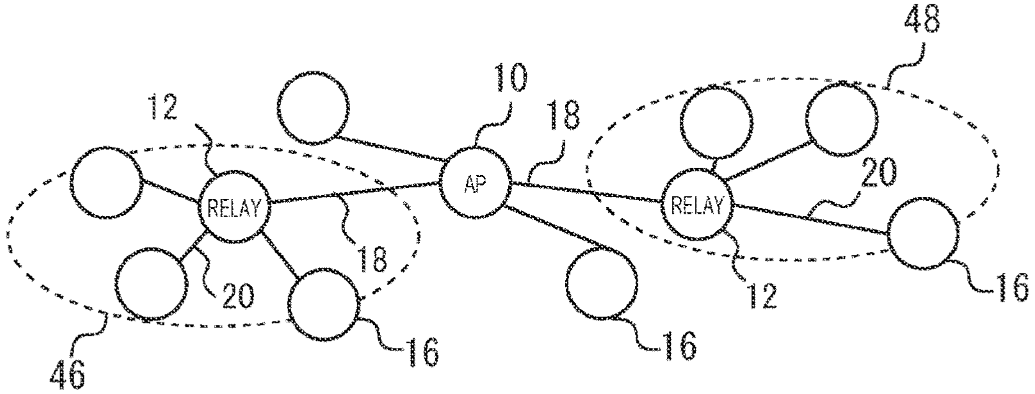
FIG. 11 is a diagram for explaining an example of a network including a wireless communication supervising system of a second embodiment of the present disclosure.

Next, a second embodiment of the present disclosure will be described with reference to FIGS. 11 to 13. FIG. 11 illustrates an example of a network including a wireless communication supervising system of the second embodiment of the present disclosure. Note that, in FIG. 11, elements corresponding to those illustrated in FIG. 1 are denoted by the same reference numerals, and the description thereof will be omitted or simplified.

As illustrated in FIG. 11, in the network of the present embodiment, a plurality of tree configurations is formed below a first AP 10. Specifically, in addition to a plurality of second STAs 16 that directly establishes communication with the first AP 10, a first tree 46 and a second tree 48 are connected.

Each of the first tree 46 and the second tree 48 includes a first STA 12 in charge of a relay function and a second STA 16 communicating with the first AP 10 via the first STA 12. As a result, in the present embodiment, a first link 18 and a second link 20 that are paths of wireless communication are formed in each of the first tree 46 and the second tree 48.

Feature of Second Embodiment

Figure 12:
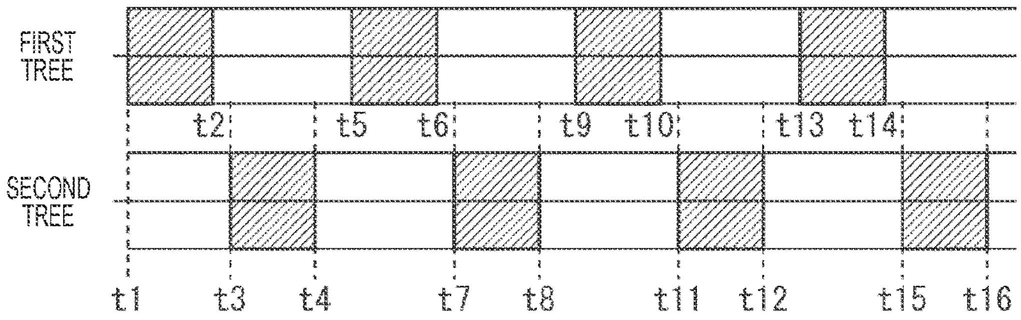
FIG. 12 is a diagram for explaining a feature of the wireless communication supervising system of the second embodiment of the present disclosure.

FIG. 12 is a timing chart for explaining an outline of a communication rule adopted in the present embodiment. More specifically, the upper part of FIG. 12 illustrates transmission periods (hatching periods) for the first link 18 and transmission periods (white periods) for the second link 20 set for the first tree 46. In addition, the lower part of FIG. 12 illustrates transmission periods (hatching periods) for the first link 18 and transmission periods (white periods) for the second link 20 set for the second tree 48.

A transmission period of the first tree 46 and a transmission period of the second tree 48 each are set similarly to the case of the first embodiment. For this reason, in any tree, a transmission period for the first link 18 and a transmission period for the second link 20 are set not to overlap each other in each tree. In addition, these transmission periods are set to keep a balance not to cause packet congestion at a relay point.

In a case where a mesh configuration or a tree configuration having a plurality of branches is used as in the network in the present embodiment, if a transmission period for the first link 18 in one tree configuration overlaps with a transmission period for the first link 18 in another tree configuration, frame collision is likely to occur. For this reason, in the present embodiment, repeaters of a wireless LAN are synchronized with each other, and information on transmission cycle in each tree configuration is exchanged between the repeaters. Then, a repeater (first STA 12) of each tree is caused to select corresponding transmission cycle so that the transmission cycle does not overlap with a transmission cycle of a repeater (the first STA 12) around.

Synchronization between the repeaters can be implemented by a Time Sync method. Alternatively, a method may be adopted of indicating a transmission cycle by calculating a relative time from a time stamp in a frame of each wireless LAN. In addition, timing control based on a target beacon transfer time (TBTT) may be performed so that the first AP 10 does not become an exposed node. Further, collision of frames can be suppressed by making each transmission period known in the network.

Figure 13:
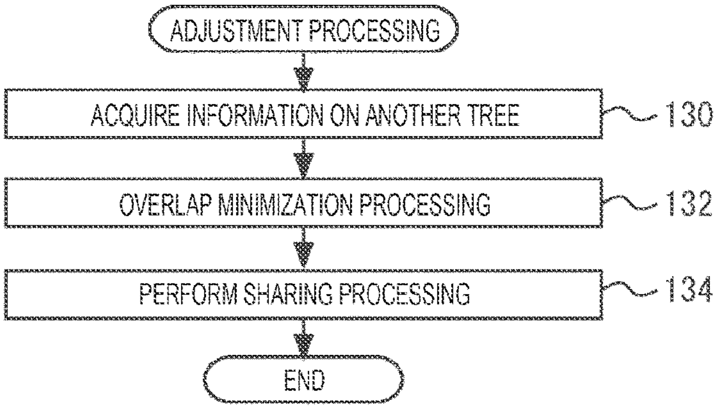
FIG. 13 is a flowchart for explaining a flow of processing performed by a repeater in the second embodiment of the present disclosure.

FIG. 13 is a flowchart for explaining a flow of processing executed by the first STA 12 arranged in each tree to implement the function described above. According to a routine illustrated in FIG. 13, the first STA 12 first acquires information on a transmission period or a transmission cycle set in another tree (step 130).

Next, processing is executed for minimizing overlap between transmission periods (step 132). If each of a plurality of trees sets the transmission periods for the first link 18 and the second link 20 aiming for optimization in the tree, overlap between transmission periods occurs to some extent between adjacent trees. Here, for the plurality of trees, its own transmission cycle is determined with respect to a transmission cycle of another tree to minimize overlap between transmission periods for the first links 18 and overlap between transmission periods for the second links 20.

Thereafter, processing is executed for sharing the set transmission cycle among devices in the network (step 134). As a result, in each tree, each device performs transmission processing in accordance with the transmission cycle and the transmission period set for the tree. As a result, collisions between the plurality of tree configurations are minimized and efficient communication is implemented throughout the network.

REFERENCE SIGNS LIST

10 First parent device (first AP)
12 First child device and repeater (first STA)
14 Second parent device (second AP)
16 Second child device (second STA)
18 First link
20 Second link
22, 36 Control unit
24, 38 Transmission unit
26, 40 Reception unit

The invention claimed is:

1. A wireless communication supervising method for managing wireless communication of a network including a first link for wireless communication between a repeater and a parent device and a second link for wireless communication between the repeater and a child device, the wireless communication supervising method comprising:

setting a first transmission time during which transmission is permitted to the first link on a basis of a first amount of transmission to be communicated on the first link;

setting a second transmission time during which transmission is permitted to the second link on a basis of a second amount of transmission to be communicated on the second link;

determining an entire transmission cycle on a basis of the first transmission time and the second transmission time, and determining a first transmission period corresponding to the first transmission time and a second transmission period corresponding to the second transmission time not to cause the first transmission period and the second transmission period to overlap each other in the entire transmission cycle, wherein the first transmission period and the second transmission period are determined based on a ratio of the first transmission time and the second transmission time; and controlling a wireless device included in the network such that wireless transmission to be performed on the first link is limited within the first transmission period and wireless communication to be performed on the second link is limited within the second transmission period.

2. The wireless communication supervising method according to claim 1, further comprising:

acquiring a first transmission rate to be achieved on the first link; and acquiring a second transmission rate to be achieved on the second link, wherein the first transmission time is set on a basis of the first transmission rate, and the second transmission time is set on a basis of the second transmission rate.

3. The wireless communication supervising method according to claim 1, further comprising calculating a number of packets receivable by the repeater when the packets are transmitted to the first link in a case where uplink traffic is generated more than downlink traffic, wherein the first transmission time is set on a basis of a time required to transmit the number of packets on the first link, and the second transmission time is set on a basis of a time required to upload the number of packets toward the repeater through the second link.

4. The wireless communication supervising method according to claim 1, further comprising calculating a number of packets receivable by the repeater when the packets are transmitted to the second link in a case where downlink traffic is generated more than uplink traffic, wherein the second transmission time is set on a basis of a time required to transmit the number of packets on the second link, and the first transmission time is set on a basis of a time required to download the number of packets toward the repeater through the first link.

5. The wireless communication supervising method according to claim 1, wherein a bandwidth wider than a bandwidth used by the second link is allocated to the first link.

6. The wireless communication supervising method according to claim 1, wherein the network includes a plurality of repeaters each relaying the first link and the second link to each other, the wireless communication supervising method further comprises setting the entire transmission cycle such that, for at least one of the plurality of repeaters, overlap between the first transmission periods and overlap between the second transmission periods with another repeater are minimized.

7. A wireless communication supervising system comprising a network including a first link for wireless communication between a repeater and a parent device and a second link for wireless communication between the repeater and a child device, the wireless communication supervising system being configured such that at least one of the repeater or the parent device, or both of the repeater and the parent device execute:

setting a first transmission time during which transmission is permitted to the first link on a basis of a first amount of transmission to be communicated on the first link;

setting a second transmission time during which transmission is permitted to the second link on a basis of a second amount of transmission to be communicated on the second link;

determining an entire transmission cycle on a basis of the first transmission time and the second transmission time, and determining a first transmission period corresponding to the first transmission time and a second transmission period corresponding to the second transmission time not to cause the first transmission period and the second transmission period to overlap each other in the entire transmission cycle, wherein the first transmission period and the second transmission period are determined based on a ratio of the first transmission time and the second transmission time; and controlling a wireless device included in the network such that wireless transmission to be performed on the first link is limited within the first transmission period and wireless communication to be performed on the second link is limited within the second transmission period.

8. A wireless communication supervising device that manages wireless communication of a network including a first link for wireless communication between a repeater and a parent device and a second link for wireless communication between the repeater and a child device, the wireless communication supervising device being configured to execute:

setting a first transmission time during which transmission is permitted to the first link on a basis of a first amount of transmission to be communicated on the first link;

setting a second transmission time during which transmission is permitted to the second link on a basis of a second amount of transmission to be communicated on the second link;

determining an entire transmission cycle on a basis of the first transmission time and the second transmission time, and determining a first transmission period corresponding to the first transmission time and a second transmission period corresponding to the second transmission time not to cause the first transmission period and the second transmission period to overlap each other in the entire transmission cycle, wherein the first transmission period and the second transmission period are determined based on a ratio of the first transmission time and the second transmission time; and controlling a wireless device included in the network such that wireless transmission to be performed on the first link is limited within the first transmission period and wireless communication to be performed on the second link is limited within the second transmission period.

* * * * *